United States Patent [19]
White

[11] Patent Number: 5,056,554
[45] Date of Patent: Oct. 15, 1991

[54] FLUID LOSS, DAMAGE PREVENTION AND CONTROL SYSTEM

[76] Inventor: F. Grove White, P.O. Box 4, Midtothian, Va. 23113

[21] Appl. No.: 217,345

[22] Filed: Jul. 11, 1988

Related U.S. Application Data

[63] Continuation-in-part of Ser. No. 89,074, Aug. 25, 1988, abandoned, which is a continuation-in-part of Ser. No. 16,866, Feb. 20, 1987, Pat. No. 4,730,637.

[51] Int. Cl.⁵ .................. F16K 31/02; G01F 1/24
[52] U.S. Cl. .................. 137/486; 73/40.5 R; 73/198; 73/861.03; 73/861.77; 137/487.5; 137/624.11; 137/312; 137/599; 251/129.05; 251/129.08; 364/510; 364/571.04; 364/571.05; 377/21
[58] Field of Search .......... 137/59, 87, 459, 487.5, 137/599, 624.11, 624.2, 468, 486, 312; 251/129.08, 129.05; 73/40.5 R, 198, 861.03, 861.77, 861.78; 364/509, 510, 571.04, 571.05; 377/21

[56] References Cited

U.S. PATENT DOCUMENTS

| | | | |
|---|---|---|---|
| 3,200,637 | 8/1965 | Ballou et al. ............. | 137/487.5 |
| 3,369,561 | 2/1968 | Zimmerman et al. ........ | 137/487.5 |
| 3,416,560 | 12/1968 | Bruno ..................... | 137/487.5 |
| 3,555,901 | 1/1971 | Delatorre et al. ......... | 364/510 |
| 3,726,296 | 4/1973 | Friedland et al. ......... | 137/487.5 |
| 4,093,871 | 6/1978 | Plumb et al. ............. | 73/861.03 |
| 4,134,423 | 1/1979 | Mayer .................... | 364/510 |
| 4,180,088 | 12/1979 | Mallett .................. | 137/459 |
| 4,238,825 | 12/1980 | Geery .................... | 73/861.03 |
| 4,244,396 | 1/1981 | Friedland et al. ......... | 137/487.5 |
| 4,333,486 | 6/1982 | Ciccozzi ................. | 137/487.5 |
| 4,663,977 | 5/1987 | Vander Heyden ............ | 364/510 |
| 4,705,060 | 11/1987 | Goulbourne ............... | 137/487.5 |
| 4,813,443 | 3/1989 | Pounder .................. | 137/1 |
| 4,816,987 | 3/1989 | Brooks et al. ............ | 137/487.5 |
| 4,888,706 | 12/1989 | Rush et al. .............. | 364/510 |
| 4,942,758 | 7/1990 | Cofield .................. | 364/510 |

*Primary Examiner*—George L. Walton
*Attorney, Agent, or Firm*—Richard C. Litman

[57] ABSTRACT

A control system apparatus for a fluid distribution system includes a low-voltage circuit and a positive displacement disc in a throughput line such that as fluid displaces the positive displacement disc a magnet associated therewith is also rotated. The rotating magnet sets up a magnetic flux that is sensed by a switch in close proximity to the rotating magnet and when the switch closes a low-voltage current is allowed to pass to a time delay relay, which in turn monitors the duration and strength of the low-voltage current and can, under program control, further actuate another branch of the low-voltage circuit, which causes a normally open valve to be closed by a solenoid. As the solenoid is actuated, the water flowing in the throughput line is shut off.

1 Claim, 4 Drawing Sheets

FLUID LOSS, DAMAGE PREVENTION AND CONTROL SYSTEM

CROSS-REFERENCE TO RELATED APPLICATION

This is a continuation-in-part application of continuation-in-part application Ser. No. 089,074 for a Fluid Loss and Damage Prevention Control System, filed Aug. 25, 1988, now abandoned, which is a continuation-in-part application of Ser. No. 016,866, which matured into U.S. Pat. No. 4,730,637 on Mar. 15, 1988.

FIELD OF INVENTION

This invention relates to apparatus for opening and closing hydraulic valves in response to changes from preselected flow rates which flow rates are sensed by a flow meter disposed in the fluid flow path and which transmits signals for control circuitry whereby the valves are controllable by a solenoid-actuating mechanism in response to the control signals.

BACKGROUND OF THE INVENTION

The present apparatus relates to fluid-flow meter and valve control systems that, when operative senses the rate of flow of a fluid, such as water, which is flowing in a distribution network. The control system causes the flow to be shut off by actuating one or more in-line valves. This actuation mechanism, responding to a flow of fluid in excess of a pre-set threshold limit, activates one or more solenoids to isolate a branch of the fluid-carrying system.

The present device particularly relates to low-voltage, electrohydraulic fluid control networks, having pre-set within itself a base profile of flow patterns in the distribution network such that, when this base profile of flow is exceeded, the system will actuate and close the solenoid-controlled valve or valves.

All domestic and commercial structures have non-process water distribution systems and these systems have typical variable flow patterns of water usage. These distinct flow patterns occur as a result of water appliance usage, the time-of-day usage as well as as well as the day of the week and/or other variables. For example, it can be established within rather tight upper and lower ranges of water usage, how much water will be used in any given commercial buildings during a specified period of time.

Water fountains, sinks, lavoratories, and water closets all contribute to the volume of flow of water and the profile of water usage on given days and hours of the day. Such profile data of water usage, both the volume per hour and the characteristics of flow, determine the profile of flow as measured over that duration of time, and can be used to program a control system to monitor such flow and activate the system when either the rate of flow or volume of flow exceeds pre-set parameters.

By first establishing such typical profiles in any given application and setting a time limit to any planned intermittent pattern of usage, it is possible to detect unwanted flow, such as may be occurring from a leaking washing machine, overflowing toilets, a ruptured pipe, or a sprinkling garden hose left on accidentally. In a residential application, for example, it has been established that a typical single-family dwelling would not normally have water flowing continuously for more than thirty minutes, except when watering a lawn or washing an automobile. By incorporating a flow-sensitive switch controller in the incoming water line just after the main shut-off valve, a time-delay relay can start the time cycle each time flow commences.

Should the timed flow-volume of water in the system exceed the maximum set by the timer, the system automatically shuts off by energizing a solenoid valve that is also located in the main line of the distribution system. When this solenoid is energized, the valve closes and the distribution line is shut down.

DESCRIPTION OF THE PRIOR ART

Applicant's U.S. Pat. No. 4,730,637 discloses a device which addresses the problem of fluid control after a predetermined lapse of time, but this device does not provide the degree of sensitivity nor precision adjustments control of the present device. Specifically, the device as disclosed by applicant's patent, when installed, shuts down gas flow to a gas-heated water heater as well as the water distribution system.

Previous efforts by the present inventor address this control problem quite extensively. The system utilized a programmable controller system using a flow meter to generate an electrical signal that is sent to the controller. The present embodiment of the flow meter incorporates an optical chopper to provide modulated signals for processing by solid state electronic circuitry of intelligence correlative to the flow of fluid moving through the piping network.

SUMMARY OF THE INVENTION

It is a feature of the invention to provide a new and novel liquid flow meter incorporating an improved sensor of a character providing signal readout facilities whereby the ascertaining of the volume and rate of change of flow in a water supply network may be sensed without physical contact beteen the readout transducer and the internal structure of the flow meter, and wherein the sensed electrical signals are utilized to control a system incorporating a microprocessor for response to the novel sensor and for incorporating control instrumentalities for a plurality of variables in the system perameters to provide shutdown of a solenoid-controlled valve in the system when flow rate changes are indicative of excessive leakage in a water supply system.

In correlation with the foregoing feature, it is a further feature to provide time-delay circuitry in the system whereby pre-set times for each function, such as lawn watering and washing of automobiles, is within the parameters of control exercised by these systems.

It is one object of the invention to provide a liquid control system for an open-ended water supply network which includes a new and novel flow meter incorporating a separate sensor and control system wherein a light beam from a light-emitting diode (L.E.D.) is projected onto and reflected from a light-chopping reticle and the reflected light therefrom is reflected to or caused to impinge upon a photo transistor transducer, which control system is uniquely capable of providing timing-out and subsequent shutdown of the solenoid control valve upon an indication of a time period overrun which is indicative of possible or foreseeable leakage or other water loss in the system such, for example, as a faucet left open for an extended period of time.

It is a further object of the invention to provide a new and novel liquid-flow sensing transducer and sensor-controlled system which is uniquely capable of providing substantially all of the advantageous features of systems heretofore or now in general use and which accomplishes all of the desired functions of such prior art systems of this general character in a manner providing satisfactory operation under changing flow-volume or flow-rate actuating conditions, for overcoming the disadvantages of such prior art systems by providing in the circuitry of such systems provisions for a high order of sensitivity control of time-delays circuitry for actuating a solenoid control or a solenoid-actuated valve for valve closure with undesired water-flow conditions arising in the distribution network system.

It is another object to provide a water or liquid flow control system which is functional when subjected to sensed changes in water-flow conditions to provide activation of microprocessor-controlled switching devices for operation of a solenoid-actuated flow valve including remote monitoring of time-delayed controls at a distant station from said flow meter and solenoid control valve.

DESCRIPTION OF THE PREFERRED EMBODIMENT

Figure 1:
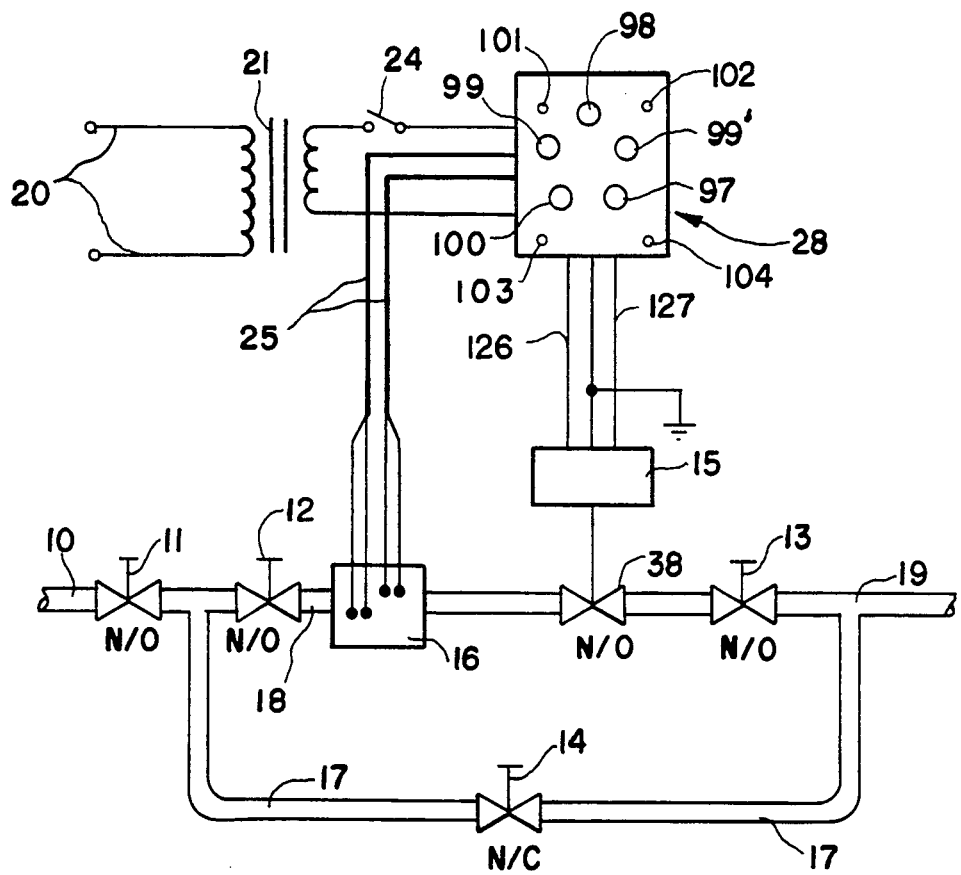
FIG. 1 is a partially electrical schematic and partially hydraulic diagrammatic illustration of the basic electrical and hydraulic control system of the invention.

Referring now to the drawings wherein like reference characters designate the same or similar elements throughout the drawings and more particularly to FIG. 1, wherein a water distribution network system is shown in which pressurized water is supplied through a service line 10. This service line 10 has a system shut-off valve 11 ahead of a shunt or by-pass line 17. The throughput line 18 includes a pair of normally-open manual control valves 12 and 13 bounded by the shunt or by-pass line 17.

The bypass line 17 itself includes a normally-closed manual control valve 14. In the event service of the control portion of the system is needed, manual control valves 12 and 13 are closed and manual control valve 14, in bypass line 17, is opened. Flow is thereby directed around the area in need of repairs and is distributed through bypass line 17 to the building supply line 19.

When the system is operating normally, flow through the line 18 is monitored by flow meter 16 and manual control valve 14 and bypass line 17 is closed. The manual control valves 12 and 13 are open during controlled operation of the water distribution network.

The system control comprises an a.c. electrical service line 20 supplying power to a low voltage electrical network. While not shown, it is obvious that a switch may be incorporated in the service line. A step-down transformer 21 reduces the input voltage from the 120 volt a.c. of the utility service supply source to 24 volts at the transformer secondary output to provide low-voltage power to the control circuit.

Figure 4:
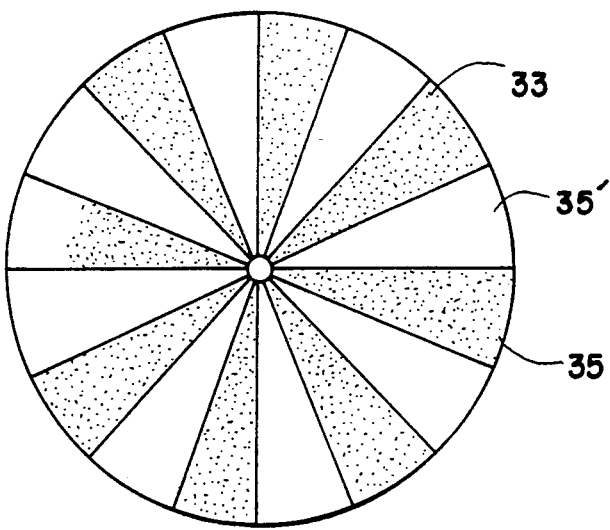
FIG. 4 is a plane view of an electrical chopper reticle.
Figure 5:
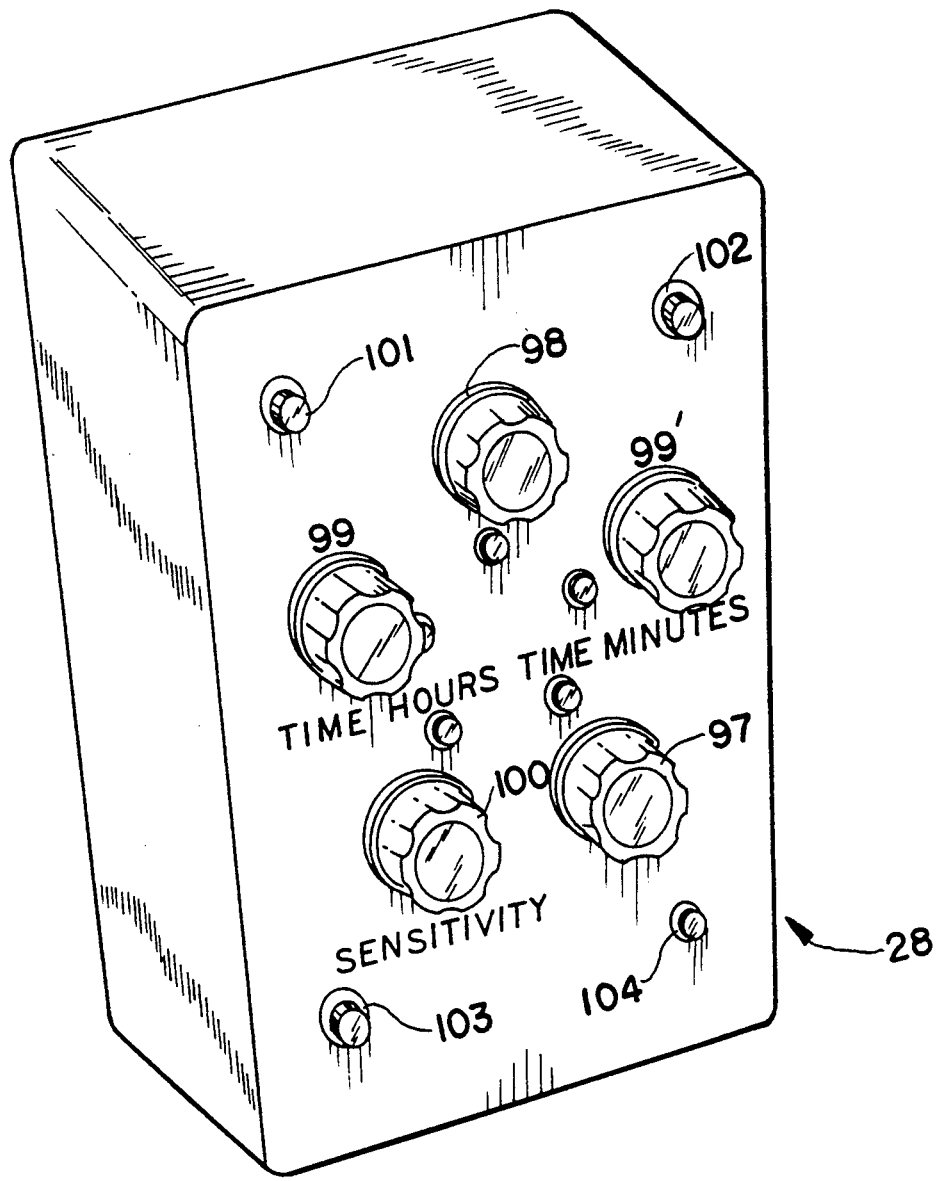
FIG. 5 is an illustration of the control box for the electrical portion of the system.

A low voltage switch 24 is deployed between step-down power transformer 21 secondary and a time delay relay and control box 28, of FIG. 5 which in turn controls a solenoid valve 15 when pre-set limitations programmably set within the time-delay relay and control box 28 circuitry conditions are exceeded. When closed the low-voltage switch 24 activates the control circuit hereinafter described in greater detail, allowing a chopped or voltage-modulated output current from a light-sensing device and transistor amplifier or a Darlington photo transistor as shown at 27 of FIG. 3 to pass along line 25 to be coupled to a microprocessor I.C. chip 26 of FIG. 2. A low-voltage d.c. source energizes an L.E.D. (light-emitting diode) 29, FIG. 3 completing a signal circuit between a flow meter 16 in the throughput line 18 and the time delay relay and control box 28. The flow meter at 16 which is described in greater detail with the following description taken with the illustrations of FIG. 3, contains a positive displacement metering impeller and magnetized disc 30 and includes a second permanent magnet disc 31 of single or multiple pole pairs. Each rotation of the magnetized disc 30 inside the meter housing 34 causes the permanent magnet 31 to correspondingly rotate along with the optical chopping reticle disc 33 of FIG. 4 since it is mechanically fastened to magnet disc 31. A suitable configuration allows the disc and magnet to make a single turn per the flow of 1/50th gallon of water through the line 18.

By physically locating the magnetically-sensitive disc 31 within the flux field of the magnet of disc 30 in the flow meter 16 the light energy from the L.E.D. 29 is chopped by the radially extending varying contrast sections 35 and 35' of reticle disc 33 and is caused to be reflected onto the Darlington photo transistor 27, to in effect open and close the light path in direct proportion to the frequency of rotation of the reticle chopper disc 33 and its magnet 31. By this method, each time the metering disc 30 rotates through one revolution, the non-attached but magnetically coupled chopper disc 33 modulates an electrical signal pulse which is conducted by lead pair 23 to the microprocessor I.C. (integrated circuit) time delay relay and control box 28.

Time delay relay and control box 28 incorporates within itself the aformentioned microprocessor chip I.C.26 which may for example be a Motorola type 6805R2. It is fed a frequency-modulated signal by instrumentalities, the technology of which is already known in the art, or obvious to one skilled in the relevant electronic art, such that the microprocessor 26 time delay output for relay and control box 28 monitors the time duration of the electrical pulses that arise as the positive displacement disc 30 in the flow meter 16 causes disc flow blade or impeller 30 to drive disc 32 whereby it rotates. An electronically-processed profile of water usage is then electronically compared to the previously-stored signal values established for a desired control parameter by the microprocessor-type control programmer 26 associated with the time delay relay and control box 28.

As the flow sensor L.E.D. 29 and photo transistor 27 couples the electrical pulses through electrical loop pairs 22 and 23 respectively for the L.E.D. 29 and the photo transistor transducer 27 to time delay relay and control box 28 as indicated, the duration or frequency of the electrical signals are compared, and as the profile characteristics of the existing flow exceed the parameters pre-established by microprocessor control 26, a circuit 36, 37 is activated. This causes the time delay and control box 28 to actuate a solenoid 15 which thereby closes the normally open valve 38 in line 18 to shut off the supply of water in the line 19 and thus to the serviced facility.

Figure 2:
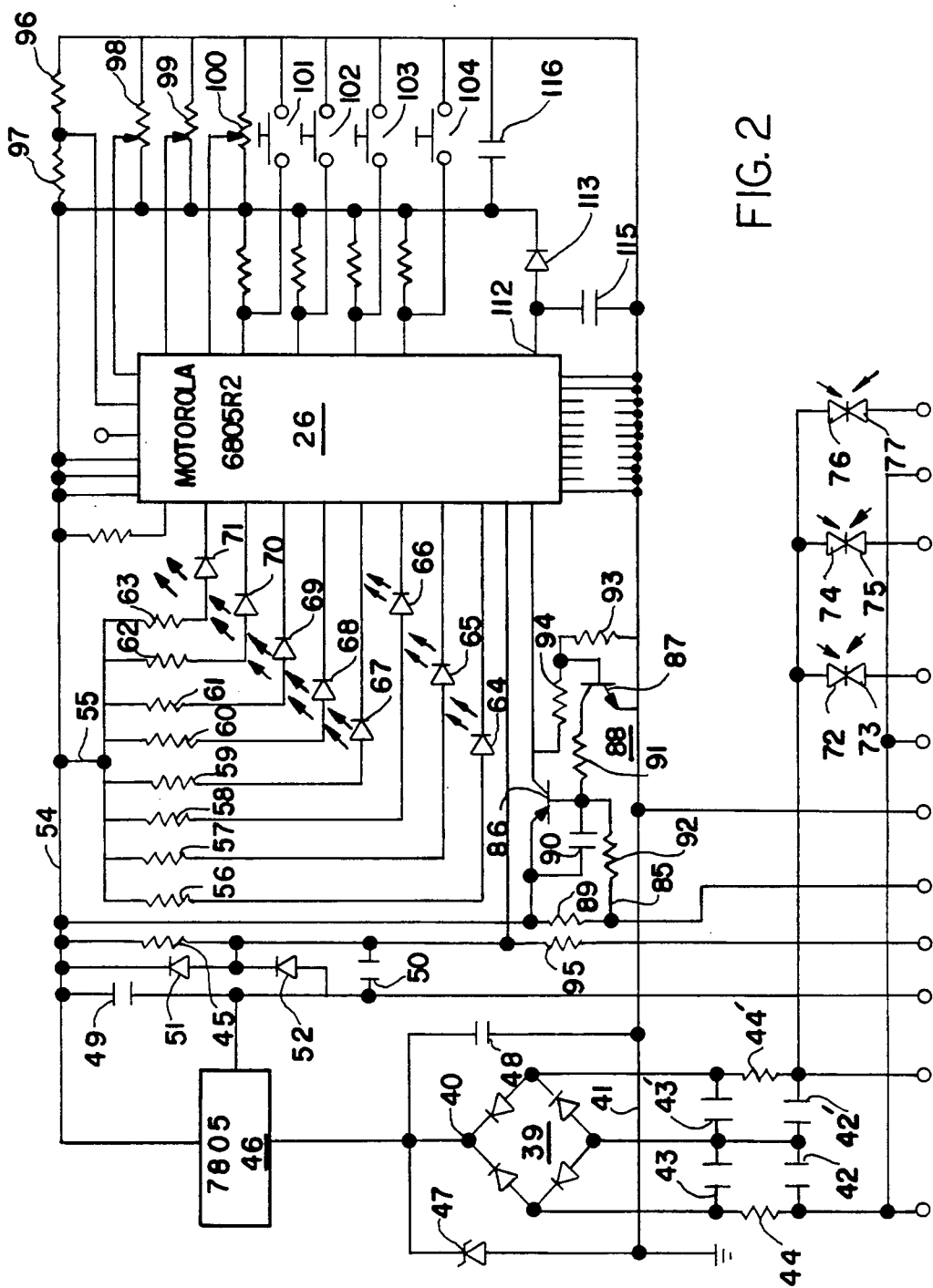
FIG. 2 is a schematic diagram of the intelligence portion showing circuit details and layout of the electrical and electronic components of the instant low-voltage, electrohydraulic control system for a typical water distribution network.

Referring now to FIG. 2 of the drawing, the description of the microprocessor 26 circuitry and manually-settable sensitivity controls are set forth in greater detail.

The microprocessor 26 is supplied by a power supply which has as its input the 24-volt a.c. output of the step-down transformer 21. The a.c. current is rectified by the full-wave bridge rectifier 39. The a.c. input circuit incorporates a filter circuit as shown, the center lead of which is a ground bus 41 which is connected to the negative side of the bridge rectifier 39. It includes the filter capacitors 42 and 42' from each side of the a.c. line, to ground followed by a ladder-type filter comprising on each side of ground bus 41 to the a.c. line, capacitors 43 and 43' together with resistors 44 and 44'. The positive terminal 40 of the bridge rectifier 39 has its output reduced at the input of the 7805 voltage regulator I.C. chip 46 with respect to ground through Zener diode 47 which establishes the optimum d.c. potential, such for example as, 12-volt d.c. at the input of the aforementioned commercially-available solid state voltage regulator I.C. 46, the input ripple of which is by-passed to ground by capacitor 48 and the output similarly bypassed to the ground bus 41 by capacitor 49 wherein a positive 5-volt d.c. required output is available at the B+ bus 54. The output additionally includes a filter circuit comprising resistor 45 and capacitor 50 which is connected to ground together with a pair of series-connected diodes 51 and 52 disposed between the 5-volt d.c. output bus 54 and resistor 53 and the input, or positive side, of capacitor 50 substantially as shown. The 5-volt d.c. is fed to a sub-bus bar 55 from the aforementioned B+ bus bar 54 to which connections are then made to a plurality of resistors 56 to 63 inclusive. Each of the resistors 56 to 63 is connected in series to an L.E.D. 64 to 71 inclusive, each of which functions as the illuminating part of an opto-isolator driver control for a respective light-actuated switch 71 to 77 inclusive for the light-receiving part of each opto-isolator 78 to 84 inclusive for the solenoids which are controlled by the light-sensitive switching portions of the opto-isolators in a manner well-known in the art. The light-emitting diodes are connected, as shown, to the microprocessor 26 output terminals as indicated.

The light pulse signal output from the photo-transistor output leads 25 of the photo-transistor 27 is applied at terminal 85 and ground to a PNP 86 and NPN 87 transistor amplifier pair 88 as shown, with the output being applied to the intermittent input terminal of microprocessor 26. The 5-volt output from the voltage regulator B+ bus with respect to ground 41 is applied to two-stage transistor amplifier 88 which is comprised of the aforementioned transistors 86 and 87. The emitter collector circuit of transistor 86 is connected to a resistor 89 from the positive 5-volt d.c. supply bus. The collector output terminal is in turn connected to the microprocessor 26 as shown.

The amplifier 88 circuitry further includes a capacitor 90 between the emitter of transistor 86 which may be of a plastic-type 2N3906 and its base as well as collector circuitry of transistor 87 and through a resistor 91 which is connected between the collector and the dividing point with a resistor 92 which is connected in turn to the junction of the capacitor 50 and the base of transistor 86 as shown. The transistor 87 circuitry includes a resistor 93 connected between the base thereof and ground. It is thus connected to provide a voltage divider comprising the aforementioned resistor 93 and resistor 94. The emitter collector circuitry thereof is connected through resistor 91 and resistor 92 to ground bus 41. The transistor 87 may be a plastic-type 2N3904. It has been noted above that the two transistors are respectively a PNP and a NPN type.

Figure 3:
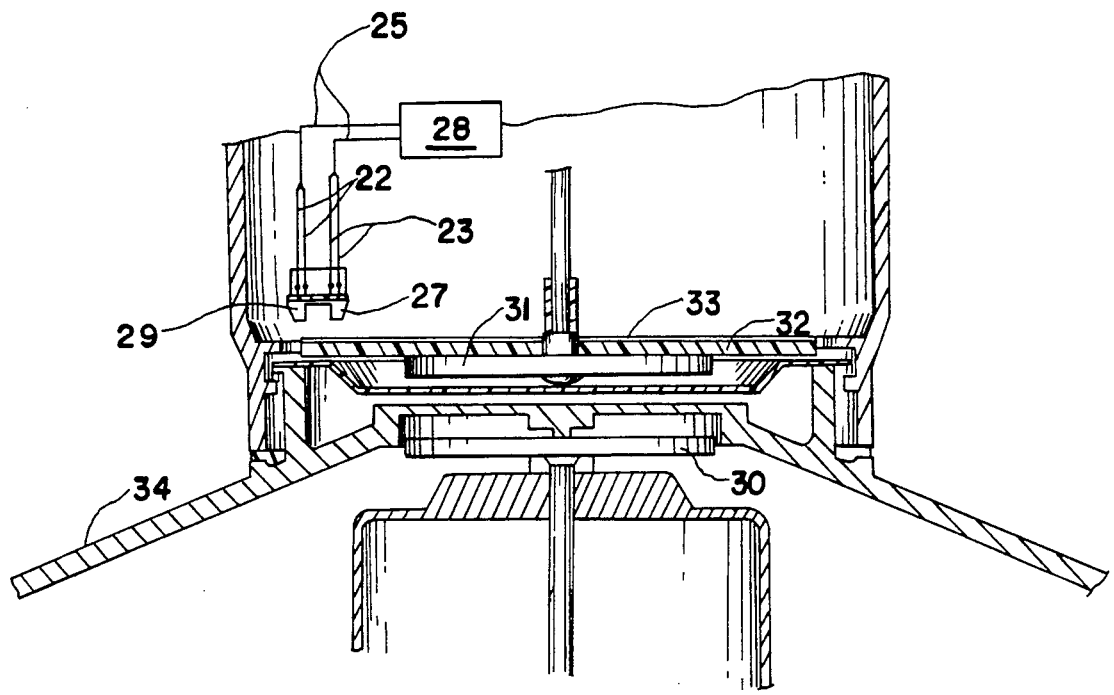
FIG. 3 is an illustration of the structural details of the flow meter and the related radiant energy illumination-type optical signal transducer.

The voltage from the 5-volt d.c. supply bus is dropped across resistor 95 and is fed to the disc chopper circuit by conductor pair 22 and energizes the L.E.D. 29 of the flow meter 16 sensor of FIG. 3 and by reflection, to photo-transistor 27. The L.E.D. operates on a d.c. voltage of approximately $2\frac{1}{2}$ volts.

It is to be understood that the pipes themselves will be full at all times in a normal distribution system. However, the rate of flow could be highly variable. In the afore-described embodiment of the device the normal application uses a utility meter that has a rating of 15 gallons an hour. These devices are 97–98% accurate above a half-gallon-a-minute rate of flow, which translates out to about 30 gallons an hour.

In an effort to get as much sensitivity at the low end of flow as possible, even down to 7/10th of a gallon an hour, an additional embodiment is disclosed as a supplement to the foregoing embodiment. This is utilized at the limit at which it has been found that the meter will actually rotate but at that particular rate of flow the accuracy of the meter is down in the 5–10 percentile level. However, that isn't a primary concern, since the accuracy of the meter at the very low flow-in rate is inconsequential because the problem in that situation is not to record the total gallons of flow, or to have the system function by virtue of volume, but to have it function by virtue of rate. This is what would happen obviously in a slow leak. It would take a very, very long time to even hit a volume of one gallon, which would be very low on the recorder in that regard. So, while the present design of the preferred embodiment actually sends a pulse signal out for 1/800th of a gallon, i.e. when the meter is operating at its normal 98–99% efficiency, it is recognized that at very low flow there is a lot of slippage and the system is not accurately recording the volume of flow. To reiterate the point, it is not a concern with the volume recording as much as it is the rate of flow for the detecting of, for example, the very slow leak or a washing machine leaking or something of that nature.

It is to be understood that there could be a non-full flow in a pipe which would not necessarily give a proper reading of flow rate unless the system is monitoring both, and the type of flow meter readout that is presently proposed would in effect transmit the output of the positive displacement of a vaned wheel in the meter so that accurate control signals result from the use of the instant type photosensitive transducer or optical-type readout device.

There is no physical contact between the readout transducer and the internal structure of the flow meter. The sensed electrical signal pulses from the phototransistor signal transducer are utilized as an input to control the hydraulic system which incorporates a microprocessor, for response to the novel sensor and for incorporating control means for a plurality of variables in the several parameters to provide shut-down of a solenoid-controlled valve in the system when flow rate changes are indicative of excessive leakage in the water supply system.

The 24-volt d.c. supply at bus 54 as provided by the full-wave bridge rectifier 39, also supplies the d.c. bus comprising lines 54 and 55 across which are connected the opto-isolator drivers 64 to 71 for the hydraulic solenoids for the fluid shut-off valves, with the first one being the double-direction actuated drain driver valve. The second is the normally-closed driver double-action valves which are all solenoid-actuated. The third is the normally-open valve driver for the valve solenoid. The solenoids are provided with coils which when actuated by a brief a.c. pulse, for example on lines 126 and 127 of FIG. 1 actuate the valves either to the open or closed position, depending upon the previous valve condition. Assuming for purposes of illustration that the valve is closed, actuation of the solenoid for that particular valve will open the valve with the application of a short duration a.c. pulse thereto and it will in effect be back in open condition until closed by the application of a second, or subsequent, a.c. current pulse at that valve to move the valve closure element in the opposite direction. To change the actuation of the valve the drivers are actuated by the respective switches for the control drivers of the opto-isolators as on FIG. 2 and as connected through their respective series resistors to the respective output terminals of the microprocessor substantially as illustrated.

Additionally the temperature-sensing resistor at 96 is connected through its series resistor 97 to the 5-volt bus 54. The intermediate point between the resistor and the temperature-sensing resistor 96 which is used as a freeze-indicating device is connected, as shown on FIG. 2, to the microprocessor I.C. 26. In like manner, the potentiometers 98, 99 and 100 are respectively connected as the volume, time and shut-down sensitivity controls from remote sensors (not shown) where they feed the appropriate terminals of the microprocessor 26. The opposite ends of the potentiometers are connected respectively to the positive side of the 5-volt d.c. bus and ground. Additionally, four switches are connected to the microprocessor I.C. chip 26, and the 5-volt d.c. bus by series resistors 101, 102, 103 and 104. The terminal 112 is connected to the diode 113 to the 5-volt d.c. bus and is connected by time delay capacitor 115 to ground. The diode 113 is thus connected between and through terminal 112 which is the reset point of the microprocessor to the 5-volt d.c. bus, and the input to the reset diode 113 is also bypassed to ground by capacitor 116.

A plurality of terminals which comprises eight connections to the microprocessor I.C. chip 26 and eight terminals which are connected adjacent to the former into ground bus 41 whereby the function terminals freeze sensor 96, volume potentiometer 98, time potentiometer 99, sensitivity potentiometer 100, water shutoff switch 101, reset switch 102, bypass switch 103 and drain switch 104, are provided at each of these microprocessor I.C. chips 26 as indicated.

Figure 6:
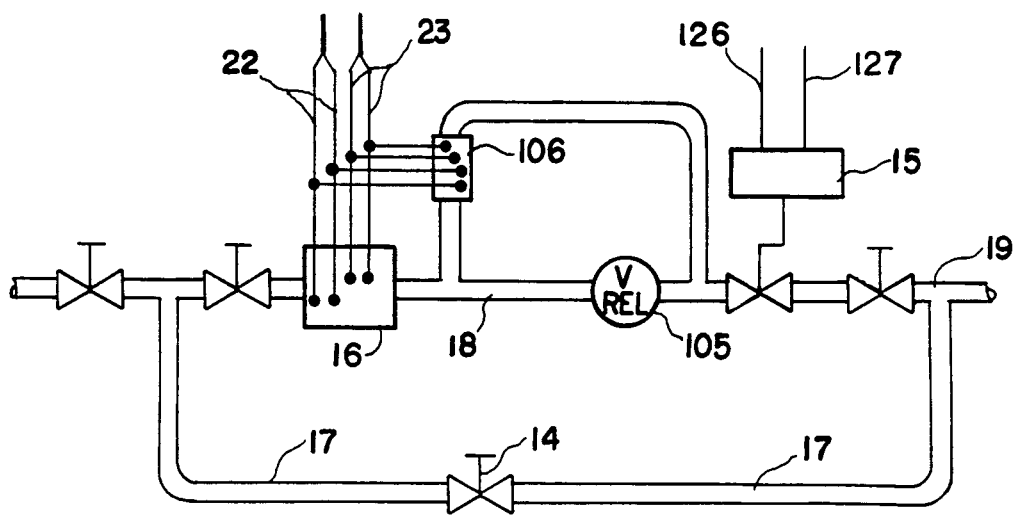
FIG. 6 is a schematic diagram of an alternative embodiment of the invention which is utilized for very low flow conditions.

The circuitry as shown in FIG. 6 may be provided as an option when the high-volume meter 16 which has a range of, for example, one-half gallon to 25 gallons per minute is not being subjected to a flow of as much as one-half gallon per minute. In this instance, a second flow meter of increased sensitivity, from approximately 0.1 gallon per hour to 30 gallons per hour may be incorporated into the system to detect dripping faucets which drip at a very low rate, or the the like. The system incorporates a pressure release valve 105 which is set at a relatively low pressure of, for example, 1 pound per square inch whereby this valve functions to close the very-low flow path, whenever the pressure drop across the meter is less than 1 p.s.i. This valve then closes and the flow is diverted through an alternate flow meter 106, the setting on release valve 105 would be such that it is closed whenever flow is low enough that meter 16 will not rotate. In this case, the valve 105 could be just a spring-loaded check valve that would take less than 1 p.s.i. pressure to open. Such a system may be programmed into the microprocessor chip in the time delay relay and control box 28 in order that the signal on the flow meter 16 is recorded down to a minimum pulse frequency such, for example, as four pulses per minute, at which point the alternate meter 106 takes over and its signal applied to the microprocessor I.C. chip 26 and used to operate the controller.

It is apparent from the foregoing disclosure that the objects and advantages of the invention have been realized. Further, it is to be understood that modifications and variations will occur or be apparent to those skilled in the art to which the invention relates. It is to be understood that all equivalents thereof which fall within the scope of the appended claims are to be considered as falling within the protection provided for the invention. The limitations, if any, to the scope of the invention are to be construed as residing only in the claims.

What is claimed and desired to be protected by Letters Patent of the United States is:

1. In combination, an apparatus for regulating a low-voltage circuit, said circuit having control means, said control means including means for programmably establishing pre-set current limitations therewithin, a hydraulic system, said hydraulic system having a throughput line connected to a building supply line, said throughout line includes a control portion having a sensing means attached thereto, said sensing means actuating means for generating a low-voltage current;

said control means being adapted to monitor said low-voltage current and being actuated as said low-voltage current exceeds pre-set low-voltage limitations;

a solenoid in said circuit electrically connected to said control means and operable to manipulate one of a plurality of valves in said throughput line control portion;

said solenoid being operable to close said one valve when pre-set current limitations are exceeded, whereby fluid flow in said throughput line is shut off;

said means for sensing fluid flow in said throughput line including a positive displacement fluid-driven disc, said positive displacement fluid-driven disc being rotatable at a rate correlative to the rate of flow of fluid in said throughput line, said positive displacement disc having means magnetically coupled thereto for generating digitized low-voltage pulses of a frequency indicative of the rate of rotation of said positive displacement fluid-driven disc, said low voltage signal pulses providing a digitized input signal to a microprocessor incorporated in said apparatus which times out and actuates said solenoid;

said control means including a time-delay relay, further including in said microprocessor thereof electronic means for providing a comparison of the frequency of said digitized pulses as said pulses are produced by the means for sensing fluid flow which actuates a transducer for the control means, a bypass fluid line bounding said throughput line and said valves, a normally closed manual valve in said bypass line, whereby in the event that the control portion of the throughput line needs to be bypassed due to a malfunction in said hydraulic system, the fluid flow is diverted through said bypass line to said building supply line when said other throughput line valves are closed and said bypass valve is opened; and said fluid flow sensing means for generating a sequence of low-voltage pulses including a magnet operatively associated with said positive displacement fluid-driven disc to provide additional magnetic coupling to an optical pulse conveying-and-transducing means for providing an input signal to the microprocessor for actuating said solenoid.

* * * * *